United States Patent Office 2,892,801
Patented June 30, 1959

2,892,801
CATALYSTS

Donald E. Sargent, Ballston Lake, N.Y., assignor to General Electric Company, a corporation of New York No Drawing. Application December 13, 1955
Serial No. 552,726

5 Claims. (Cl. 252—474)

This invention relates to new catalysts which contain copper and nickel. More particularly, this invention relates to finely-divided, porous catalysts comprising copper-plated nickel in porous, activated form with copper being present in an amount equal to from 0.5 to 75, and preferably from 5 to 50 percent by weight based on the total weight of the catalyst, with the remainder of the catalyst being substantially nickel. These catalysts are prepared by reacting Raney-type nickel in an aqueous copper salt solution containing sufficient copper to provide the copper content of the finished catalyst.

Raney nickel is a well known hydrogenation catalyst and is described in Patent 1,628,190, Raney, and in J.A.C.S. 54, 4116 (1932). Raney nickel is generally prepared from an alloy containing from 10 to 85 percent nickel and from 90 to 15 percent of aluminum. This alloy is pulverized and treated with sodium hydroxide to leach the aluminum from the alloy. This results in a finely-divided porous, activated nickel catalyst. Instead of preparing the catalyst from a binary alloy of nickel and aluminum, Raney nickel may also be prepared from a nickel-base alloy in which some or all of the aluminum is replaced by silicon.

Although Raney nickel is suitable for many hydrogenations, its activity is sometimes not as high as desired. The present invention is based on my discovery that Raney nickel may be copper-plated to provide a catalyst having an activity much greater than that of the original Raney nickel. The copper-plated Raney nickel catalyst of the present invention offers advantages over plain Raney nickel in that the present catalyst, in a given hydrogenation system, particularly where a carbonyl group is being reduced, will give at least equal yields in a much shorter time than Raney nickel, may be reused many times more than Raney nickel, and is not as susceptible to poisoning as Raney nickel.

In preparing the catalysts of the present invention, Raney nickel is contacted with a solution of a copper salt. Since nickel is higher than copper in the electromotive series, nickel from the catalyst goes into solution and the copper in the solution plates upon the catalyst surface. As is the case with any plating operation of this kind, the amount of nickel which goes into solution is the atomic equivalent of the amount of copper which plates out onto the surface of the catalyst.

The preparation of the catalyst of the present invention may be carried out at any desirable temperature, such as, for example, temperatures of from room temperature up to 100° C. However, the deposition of the copper on the catalyst is sufficiently rapid at room temperature, i.e., about 25° C., so that the room temperature reaction is preferred. Among the many salts of copper which may be employed in the reaction mixture may be mentioned, copper chloride, copper sulfate, copper acetate, copper formate, and any other copper salt which is at least partially soluble in water. The concentration of the aqueous copper salt solution is not critical and may vary within extremely wide limits, for example, aqueous copper salt solutions containing from 0.1 to 40 percent by weight or more copper chloride may be employed. Furthermore, the amount of aqueous copper salt solution employed is also not critical. Thus, the present invention requires only enough of the copper salt solution to cover the Raney nickel being treated. Although the ratio of copper in the aqueous salt solution to nickel is not critical, I prefer to employ the copper salt solution in such an amount that there is present from about 5 to 50 percent by weight of copper based on the weight of the Raney nickel being treated. However, it is apparent that the aqueous salt may contain more than 50 percent by weight of copper based on the weight of the nickel being treated and if such is the case the reaction is carried only to the point where the desired amount of nickel has been replaced by copper. The reaction may then be stopped by removing the plated catalyst from the treating solution. As pointed out previously, the catalysts of the present invention contain from 0.5 to 75 percent by weight of copper based on the weight of the total weight of the finished catalyst.

In evaluating a new hydrogenation catalyst, it is necessary to compare the efficiency of the new catalyst with the efficiency of a known catalyst under a standard set of conditions. For purposes of the present invention, the copper-plated catalysts were compared to commercial Raney nickel in the hydrogenation of a given amount of glucose to sorbitol at a given temperature, with a given hydrogen pressure, and with a given amount of catalyst and under standard conditions of agitation. The reaction rate observed with the catalysts of the present invention was then compared with the reaction rates observed with Raney nickel.

I have found that the reaction which comprises the hydrogenation of glucose to sorbitol is a pseudo-first order reaction and therefore at a given hydrogen pressure and at a given temperature, the rate of reaction is directly proportional to the concentration of the material being hydrogenated. In equation form this is (1) $$-\frac{dC}{dt} = kC$$

where C is the concentratioon of glucose, $t$ is time and $k$ is a constant. Upon integration of Equation 1 from time 0 to time $t$, it is found that the logarithm of the initial concentration over the concentration at time $t$ is proportional to the time of the reaction as expressed by the following equation (2) $$\log \frac{C_o}{C_t} \sim Kt$$

where $C_t$ is the concentration of glucose at time $t$, $C_o$ is the initial concentration of glucose and $K$ is a proportionality constant.

In following the hydrogenation reactions employing the catalysts of the present invention, or employing Raney nickel, the change in concentration of glucose with time was followed by measuring the amount of hydrogen used in the reaction with time. The log of the initial concentration of glucose divided by the glucose concentration at time $t$ was plotted against time. For convenience, one thousand times the slope of the resulting straight line was taken as the "rate constant" in the present application.

The following examples are for purposes of illustration only and are not intended as a limitation on the scope of the present invention.

In each of the following examples a different catalyst was used in the hydrogenation of 45 grams of glucose in 135 grams of the monomethyl ether of ethylene glycol (methyl "Cellosolve"). The catalyst was added to this reaction mixture, and the hydrogenation was then run at a temperature of 125° C., a hydrogen pressure of about 50 p.s.i.g. under standardized conditions of agitation. The total amount of hydrogen consumed at various stages of the reaction was observed and from this data the rate constant was calculated. The Raney nickel described in all of the examples is commercial Raney nickel which is prepared by leaching the aluminum from a finely divided alloy of equal parts by weight of aluminum and nickel with the leaching solution being a sodium hydroxide solution, generally a 20 percent sodium hydroxide solution.

*Example 1*

About 3.0 grams of Raney nickel was placed in a solution of 10 ml. of 10 percent aqueous copper sulfate pentahydrate and 90 grams of water. After all of the copper had been plated on the catalyst as indicated by the change in color of the solution from the blue copper sulfate color to a green nickel sulfate color, the plated catalyst was filtered, washed in water, and washed again in methyl "Cellosolve." The catalyst was then evaluated by the method described above. This hydrogenation proceeded with a rate constant of 18.9. The copper-plated catalyst employed contained 9.5 percent by weight of copper based on the total weight of the catalyst.

*Example 2*

About 3.0 grams of Raney nickel was placed in a solution of 40 ml. of 4 percent aqueous copper acetate and 60 ml. of water. After the copper had been plated on the catalyst, the resulting product was filtered, washed in water, and washed in methyl "Cellosolve" to yield a copper-plated nickel catalyst containing 18.4 percent by weight of copper based on the total weight of the catalyst. This catalyst was then added to the reaction mixture and the reaction rate found in the hydrogenation of the glucose to sorbitol was 15.8.

*Example 3*

About 3.0 grams of Raney nickel was placed in a solution of 20 ml. of 6.83 percent aqueous copper chloride dihydrate and 80 ml. of water. After all of the copper had been plated out onto the catalyst surface the catalyst was filtered, washed in water, and then washed in the monomethyl ether of ethylene glycol to yield a catalyst containing 16.2 percent by weight of copper based on the total weight of the catalyst. A rate constant of 20.0 was observed during the hydrogenation of glucose with this catalyst.

*Example 4*

About 3.0 gram of Raney nickel was placed in a solution containing 20 ml. of aqueous 10 percent copper sulfate pentahydrate and 80 ml. of water. After all of the copper had plated on the catalyst surface, the catalyst was filtered, washed with water, and finally washed with the monomethyl ether of the ethylene glycol to yield a copper-plated nickel catalyst containing 18.0 percent copper by weight based on the total weight of the catalyst. When glucose was hydrogenated in the presence of this catalyst, the rate constant observed was 23.4.

*Example 5*

About 3.0 grams of Raney nickel was placed in a solution of 30 ml. of 10 percent aqueous copper sulfate pentahydrate and 70 ml. of water. After the copper had all been plated on the catalyst, the catalyst was filtered, washed with water, and then washed with the monomethyl ether of ethylene glycol to yield a copper-plated catalyst containing 27.0 percent by weight of copper based on the total weight of the catalyst. When glucose was hydrogenated to sorbitol in the presence of this catalyst with the reaction mixture described above, the rate constant observed was 16.1.

*Example 6*

About 3.0 grams of Raney nickel was placed in a solution of 50 ml. of 10 percent aqueous copper sulfate pentahydrate and 50 ml. of distilled water. After all of the copper had been plated on the catalyst surface, the catalyst was filtered, washed with water, and washed with the monomethyl ether of ethylene glycol to yield a copper-plated catalyst containing 44.4 percent by weight of copper based on the total weight of the catalyst. Hydrogenation of the reaction mixture described above proceeded with a rate constant of 13.8.

*Example 7*

This example describes the hydrogenation employing the reaction mixture described above and employing commercial Raney nickel which has not been given the copper plating treatment described in this application. About 3.0 grams of commercial Raney nickel were added to the reaction mixture described above and during the hydrogenation the reaction rate observed was only 4.5. From this example, it is obvious that the catalysts of the present invention are at least three times as effective as commercial Raney nickel in these hydrogenation reactions.

Although the foregoing examples have described the preparation of only a few catalysts within the scope of the present invention, it will be apparent to those skilled in the art that many other copper salts than those specifically described may be employed with success in preparing catalysts of this invention. Furthermore, it is obvious that the concentrations and amounts of the copper salt solutions employed in preparing the catalyst may also vary from the concentrations described above.

The catalysts of the present invention are useful in the hydrogenation of glucose to sorbitol as described, and are also useful in many other catalytic reactions. Thus, these catalysts may be employed in the hydrogenation of other carbonyl-containing organic compounds to the corresponding hydroxy-containing compounds. They may also be employed in the hydrogenation of compounds containing aromatic unsaturation to form cycloaliphatic compounds. In addition, these catalysts, like other Raney-type nickel catalysts may be advantageously employed in certain dehydrogenation, dehalogenation and desulfurization reactions.

What I claim as new and desire to secure by Letters Patent of the United States is:

1. A finely divided, porous nickel catalyst comprising copper-plated nickel in porous, activated form, said copper being present in an amount equal to from 0.5 to 75 percent by weight of the catalyst, and the remainder being substantially nickel, said catalyst having been prepared by treating Raney nickel with an aqeous copper salt solution.

2. A finely divided, porous nickel catalyst comprising copper-plated nickel in porous, activated form, said copper being present in an amount equal to from 5 to 50 percent, by weight, based on the weight of the catalyst, and the remainder being substantially nickel, said catalyst having been prepared by treating Raney nickel with an aqueous copper salt solution.

3. The catalyst of claim 2 which has been prepared in an aqueous copper sulfate solution.

4. The method of making a finely divided, porous, copper-plated nickel catalyst which comprises reacting Raney nickel at a temperature from 25° to 100° C. with an aqueous copper salt solution, there being employed on a weight basis from 5 to 50% copper as a copper salt based on the weight of the Raney nickel.

5. The method of claim 4 in which the aqueous copper salt solution is an aqueous copper sulfate solution.

(References on following page)

References Cited in the file of this patent

UNITED STATES PATENTS

| | | |
|---|---|---|
| 282,754 | Morton | Aug. 7, 1883 |
| 2,074,311 | Moore | Mar. 16, 1937 |
| 2,472,393 | Avallone et al. | June 17, 1949 |
| 2,541,671 | Segura et al. | Feb. 13, 1951 |
| 2,748,023 | Meth | May 29, 1956 |

FOREIGN PATENTS

| | | |
|---|---|---|
| 658,863 | Great Britain | Oct. 17, 1951 |

OTHER REFERENCES

Revue de Metallurgie, vol. 33 of 1936, pp. 489–493.
Hansen's Der Aufbau der Zweistofflegierungen, Berlin, 1936, pp. 585–588.